June 26, 1962  D. B. RICHARD  3,041,104
DEVICE FOR UNROLLING THE CANVAS TOP OF A TRAILER TRUCK
Filed Dec. 17, 1959  3 Sheets-Sheet 1
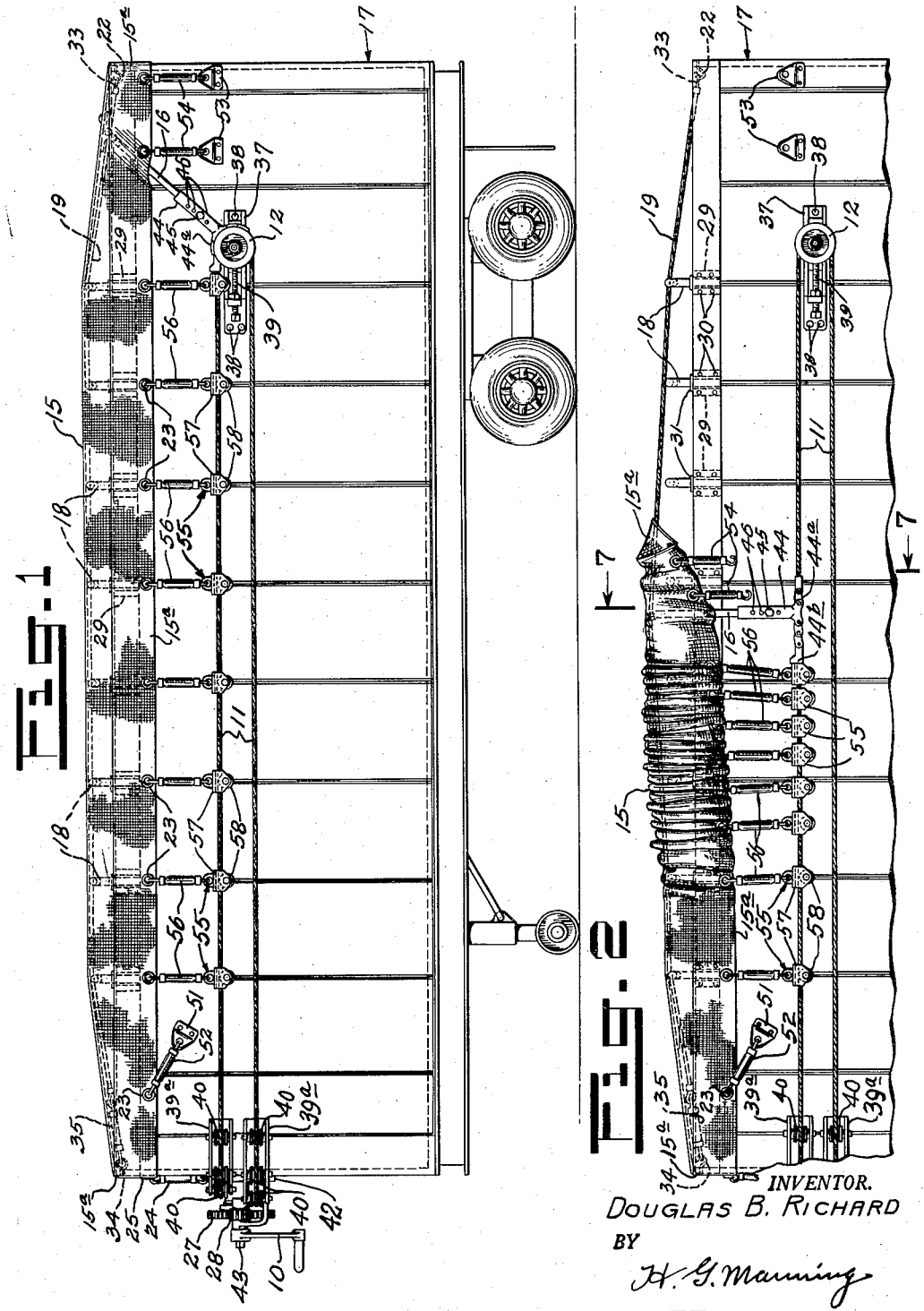
INVENTOR.
DOUGLAS B. RICHARD
BY
H. G. Manning
ATTORNEY

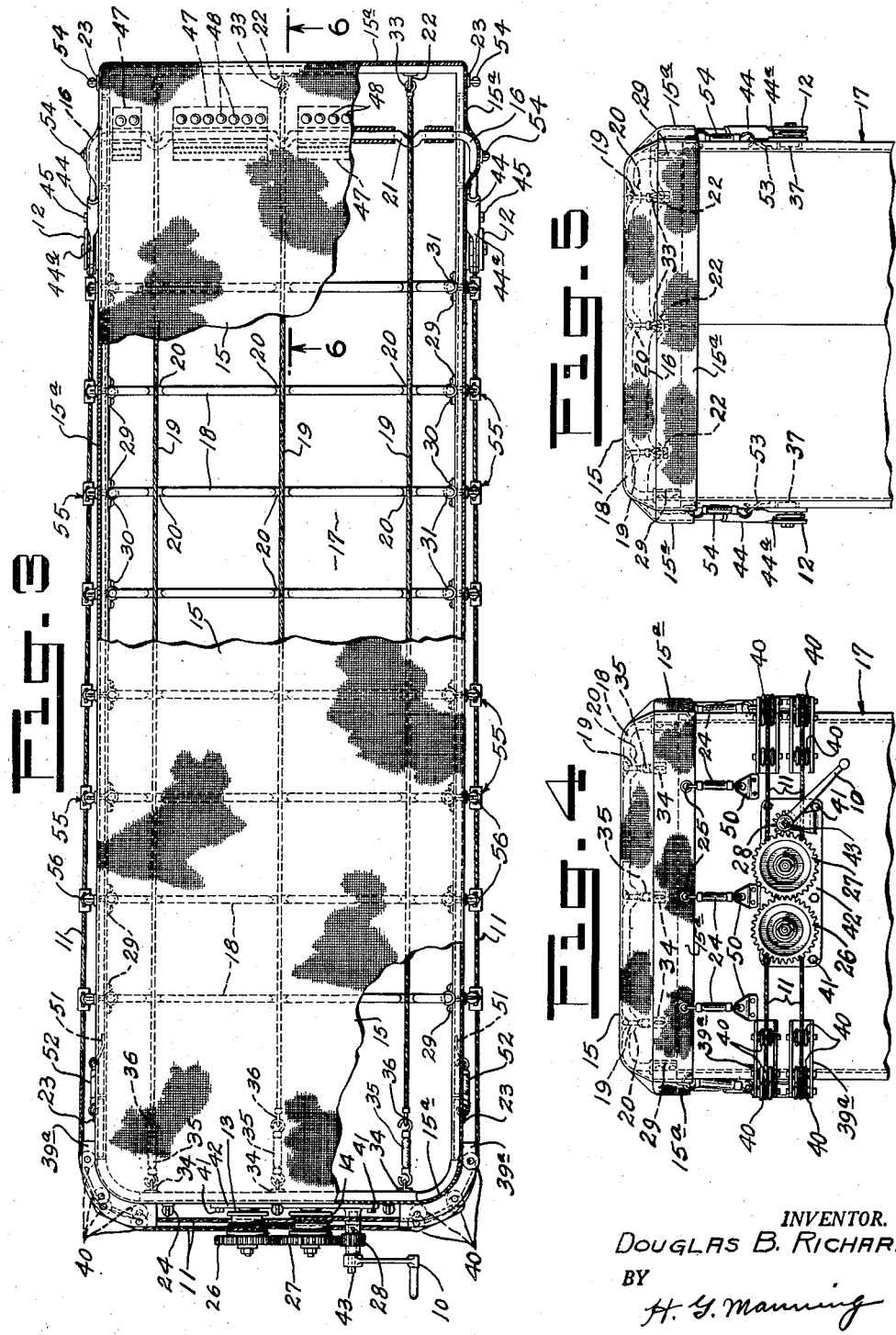

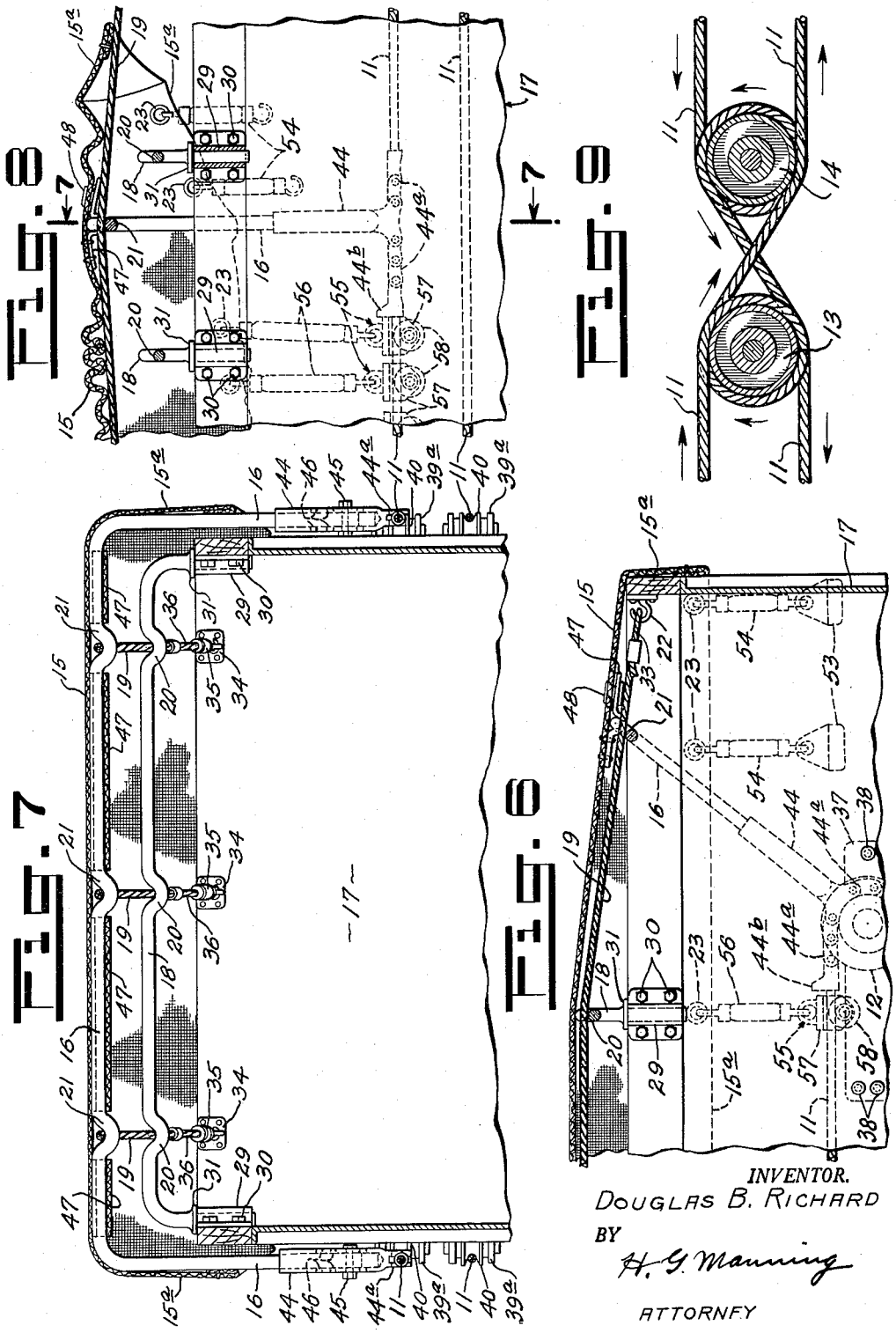

United States Patent Office 3,041,104
Patented June 26, 1962

3,041,104
DEVICE FOR UNROLLING THE CANVAS TOP
OF A TRAILER TRUCK
Douglas B. Richard, Torrington, Conn.
Filed Dec. 17, 1959, Ser. No. 860,211
3 Claims. (Cl. 296—100)

This invention relates to cargo vehicles such as trailer trucks, and is directed particularly to improvements in collapsible covers for automotive trailer truck bodies.

The principal object of this invention is to provide a collapsible cover of the above nature which can easily and quickly be operated by one man in covering or uncovering an open-topped trailer truck body or the like.

A more particular object of this invention is to provide a collapsible cover of the above nature including transverse and longitudinal support members removably secured across the top of the truck body, and a canvas top retractable from back to front upon the transverse and longitudinal support members, whereby when the canvas top is retracted and the transverse and longitudinal members are removed, free access can be had from above the truck body for loading bulky cargo without interference.

Still another object of this invention is to provide a collapsible cover of the character described which will be simple to install, economical to manufacture, and which will be strong, tight-fitting and long-wearing in use.

Other objects, features and advantages of the invention will be apparent from the following description when read with reference to the accompanying drawings. In the drawings, wherein like reference numerals denote corresponding parts throughout the several views:

FIG. 1 is a side elevational view of a trailer truck body having a collapsible cover embodying the invention fitted thereto and shown in closed or extended position.

FIG. 2 is a partial side elevational view, similar to FIG. 1, but showing the cover in partially withdrawn or retracted position.

FIG. 3 is a top view of the cover and truck body shown in FIG. 1, with portions broken away, to illustrate details of the top supporting members.

FIG. 4 is a front end view of the installed collapsible cover, illustrating details of the manual control mechanism.

FIG. 5 is a rear end view showing the installed collapsible cover.

FIG. 6 is a longitudinal cross-sectional view, taken along the line 6—6 of FIG. 3 in the direction of the arrows.

FIG. 7 is a transverse cross-sectional view, taken along the broken line 7—7 of FIG. 2 in the direction of the arrows.

FIG. 8 is a partial longitudinal cross-sectional view illustrating the operation of the retracting mechanism when the top is in partially retracted condition, and FIG. 9 is a partial view of the pulley mechanism controlling the movement of the endless side cables.

Referring now in detail to the drawings, the numeral 17 designates an open-topped truck body upon which the collapsible cover embodying the invention is installed. The collapsible cover comprises a canvas top 15 having a short peripheral skirt portion 15a which fits snugly over the outside of the truck body 17 about the upper end thereof.

Removable means is provided for supporting the canvas top 15 over the open top of the truck body 17, said means comprising a plurality of inverted U-shaped cross bows 18, the depending ends of which are removably insertable in a plurality of opposed pairs of sockets 29 (see FIGS. 6, 7 and 8) secured in longitudinally-spaced disposition, as by bolts 30 against the inside marginal edge of the truck body 17.

The vertical end portions of the cross bows 18 are provided with flanges 31 which limit the extent to which said cross bows fit into the sockets 29. As best illustrated in FIGS. 7 and 8, each cross bow 18 is formed along its length with three equidistantly spaced depressions 20 (see FIGS. 3 and 7) within which three removable longitudinally-extending ropes 19 seat.

Three spaced hooks 22 are fixed inside the rear end of the truck body 17, near the upper end thereof, to receive loops 33 formed at the rear ends of the ropes 19. Hooks 34 are fixed inside the front end of the truck body 17 near the upper end thereof for receiving hook-ended rubber tension members 35 connectable with the loops 36 (see FIGS. 3 and 7) formed at the front ends of the rope 19.

Manually operable means is provided for retracting the canvas top 15 from back to front of the truck body 17. To this end, each side of the truck body 17, near the rear end thereof, is provided with a pulley wheel 12 journalled in a bracket 37 fixed against the respective side walls of said truck body as by rivets 38 (FIGS. 1 and 2). Each pulley 12 is laterally adjustable in its respective bracket by means of a horizontal screw 39.

Fixed against the outside front corners of the truck body 17 at each side, and in opposed relationship, are a pair of U-shaped channels 39a, each carrying a plurality of idler pulley wheels 40 journalled therein. Fixed against the outside front wall of the truck body 17 and between the opposed channels 39a, as by bolts 41 (FIG. 4), is a mounting plate 42 having journalled therein in suitable bearings, a pair of laterally-spaced pulley wheels 13, 14 (FIGS. 3 and 9) which carry at their outer ends, meshed gears 26, 27. Also journalled in the mounting plate 42 is a shaft 43 (FIGS. 1, 3 and 4) having fixed thereto a pinion 28 in mesh with the gear 27, and at the outer end of said shaft, a crank handle 10.

As illustrated in FIGS. 1, 3, 4 and 9, an endless cable 11 is trained about the side pulley wheels 12 and the front pulley wheels 13, 14, being guided around the front end of the truck body 17 by the idler pulley wheels 40. The upper section of the cable 11 extends from the right side of the truck body 17, (as seen in FIG. 9) once around the front pulley wheel 14, whence it passes down under the front pulley wheel 13 and around to the left side of the truck body guided by the pulley wheels 40, whence it passes around the left side pulley wheel 12 from below and back to make a single turn about the front pulley wheel 13 from above, whence it passes down below the front pulley wheel 14 to be guided by the idler pulley wheels 40 to the right side of the truck body again and around the right side pulley wheel 12 to complete the endless circuit. It will thus be apparent that as the crank 10 is turned, the upper sections of the endless rope 11 at each side of the truck body 17 will both be moved at the same time either to or away from the front of said truck body, depending upon the direction in which said crank is turned.

Connected to the upper sections of the cable 11 at each side are a pair of T-shaped tubular clamps 44 (FIG. 6) having articulated arm portions 44a joined at their extremities to said cable sections. The opposed end portions of the U-shaped travelling arm 16 are adjustably secured in the clamps 44 as by bolts 45 extending through one of a plurality of openings 46 for adjustment of the height of said travelling arm 16. The articulated arm portions 44a enable the clamps 44 to rotate partially around the respective pulley wheels 12, as illustrated in FIGS. 1 and 6, when the top is in fully closed condition.

As illustrated in FIGS. 6 and 7, the travelling arm 16 is provided with depressions 21 within which the longitudinal ropes 19 seat. The travelling arm 16 is releasably attached to the inner side of the canvas top 15 near the rear end thereof by flaps 47, each sewed along one edge against said top and secured thereto along the other edge as by snap fasteners 48 (see FIGS. 3 and 6).

The peripheral skirt 15a of the canvas top 15 is fitted with a plurality of eyelets 23 at the right and left sides, and the front of said peripheral skirt is provided with three eyelets 25 (FIG. 4). Rubber tension members 24 having hooked ends are connected between the eyelets 25 and eyelet brackets 50 secured against the outside of the front wall of the truck body 17 to secure the front end of the canvas top in place. Connected between the foremost eyelet 23, at each side of the canvas top 15 and an eyelet bracket 51 is an inclined hook-ended rubber tension member 52.

Connected between the two rearmost eyelets 23 at each side of the canvas top 15 and the eyelet brackets 53 are hook-ended rubber tension members 54. Connected between the remaining eyelets 23 at each side, and a plurality of hook eye trolleys 55 guided on the upper sections of the cable 11 at each side of the truck body 17, are hook-ended rubber tension members 56. Each trolley comprises a U-shaped bracket 57, and a pulley wheel 58 journalled between the sides of said bracket and engaged against the underside of its cable section 11.

Operation

In operation, when it is desired to retract or collapse the canvas cover to load or unload cargo, the rear rubber tension members 54 will first be unhooked to release the rear end of the cover, after which the crank handle 10 will be turned clockwise, as illustrated in FIG. 4, to move the travelling arm 16. The first part of the travelling arm 16 motion will cause it to swing upward around the pulley 12 (see FIG. 6). When the arm 16 reaches a vertical position, (see FIGS. 2 and 8,) it will have forced the canvas top 15 and the longitudinal ropes 19 upward above the U-shaped cross bows 18. The purpose of this is to allow for easier folding of the canvas top, and to allow the travelling arm 16 to clear said U-shaped cross bows 18. The depressions 21 in the travelling arm 16 guide the longitudinal ropes 19, and as said arm continues to move forward, said ropes will drop back within the depressions 20 of the U-shaped cross bows 18, as shown in FIG. 2. These depressions 20 serve to retain the ropes in proper alignment.

As the travelling arm 16 carries the canvas top 15 along with it, the front ends 44b of the articulated arm portions 44a act as pushers for the hook eye trolleys 55, and once the canvas top has been fully retracted, it is a simple matter to unhook the rear ends of the longitudinal ropes 19 and remove, if necessary, the U-shaped cross bows 18 to provide unobstructed access to the truck body 17 through the top thereof. It will also be understood that it is a simple matter, if required, to completely remove the canvas top 15 by unhooking the remaining rubber tension members 24, 52, 54 and 56. It is also to be noted that the cable 11, can readily be tightened at each side of the truck body 17 to insure proper tension for smooth operation of the cover and retracting mechanism, simply by twisting the adjustment screws 39 in their respective brackets.

Referring to FIG. 6, it will be seen that after only a small upward swing of the travelling arm 16, the pusher ends 44b will contact the first of the trolleys 55. As the action continues, the canvas cover top 15 will fold or wrinkle as shown in FIGS. 2 and 8. This folding action of the cover top 15 is due to the pull of the spring members 56, as most clearly shown in FIG. 2. The distance of the pusher ends 44b from the center line of the travelling arm 16 prevents the folding of the cover 15 too close to said arm, and the action of said pusher ends 44b against the trolleys 55 constitutes a straight push by the short resilient springs 56 between the trolleys 55 and the sides 15a of the cover 15. This allows much easier action and requires the minimum of power.

Advantages

One advantage of this invention is that the operation of rolling and unrolling the heavy canvas top of the trailer is greatly facilitated, and considerable time is saved. It also avoids the necessity of tying and untying of ropes hanging from the sides of the former type of trailer tops.

The invention also avoids the soiling of the driver's clothing, and the necessity of climbing to the top of the trailer and standing on the cross bows to pull the canvas, which previously was a dangerous operation.

A further advantage is that the trailer top may be rolled and unrolled outdoors, even in rainy or windy weather, without much danger of wetting the freight, as it will be uncovered for such a short time.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a rectangular open-top trailer truck body, a retractable cover of flexible sheet material having a peripheral skirt portion adapted to fit about said truck body in covering relationship, a plurality of upstanding U-shaped cross bow members removably secured in spaced fixed parallel relation across the top of said truck body, a plurality of ropes extending longitudinally from end to end over the top of said trailer truck body and resting upon the intermediate portions of said cross bow members, a U-shaped vertical travelling arm having a central horizontal portion higher than said cross bow members and having a pair of opposed depending side portions located on the opposite sides of said truck body, manually operated means to move said travelling arm back and forth over said truck body, whereby it will raise said flexible top above said fixed bow members in such a manner as to facilitate the folding and unfolding of the cover of said truck body.

2. The invention as defined in claim 1, wherein said travelling arm is connected to a pair of endless cables extending longitudinally of said truck frame, said travelling arm being connected to said cables by a pair of T-shaped members.

3. The invention as defined in claim 1, wherein said cross bow members and said travelling arm are each provided with a plurality of depressions for receiving the plurality of longitudinal ropes to maintain them in proper alignment.

References Cited in the file of this patent
UNITED STATES PATENTS

| | | |
|---|---|---|
| 1,031,206 | Sowers | July 2, 1912 |
| 1,263,759 | Hanaway | Apr. 23, 1918 |
| 2,469,958 | Fowler | May 10, 1949 |
| 2,558,926 | Bramble | July 3, 1951 |
| 2,559,310 | McNavage | July 3, 1951 |
| 2,757,042 | Schultz | July 31, 1956 |
| 2,882,091 | Shield | Apr. 14, 1959 |
| 2,969,284 | Ambli | Jan. 24, 1961 |